C. MOLZ.
TRUSS.
APPLICATION FILED JAN. 15, 1907.

925,645.

Patented June 22, 1909.

Witnesses:

Inventor:
Carl Molz
By Wm E Boulter
Attorney.

THE NORRIS PETERS CO., WASHINGTON, D. C.

UNITED STATES PATENT OFFICE.

CARL MOLZ, OF KAISERSLAUTERN, GERMANY.

TRUSS.

No. 925,645.  Specification of Letters Patent.  Patented June 22, 1909.

Application filed January 15, 1907. Serial No. 352,349.

*To all whom it may concern:*

Be it known that I, CARL MOLZ, merchant, a subject of the German Emperor, and resident of Kaiserslautern, Germany, have invented certain new and useful Improvements in Trusses, of which the following is a specification.

This invention relates to trusses or hernia bandages and its object is to provide a device of this kind which is especially distinguished from other trusses by the fact that the pressure of the pad may be easily and readily controlled during wear by the patient.

A further object of this invention is to provide a truss wherein the pressure owing to the incorporation of a spiral spring is rendered elastic in such a manner that the pad is adapted to accommodate itself to every motion of the body.

Figure 1:
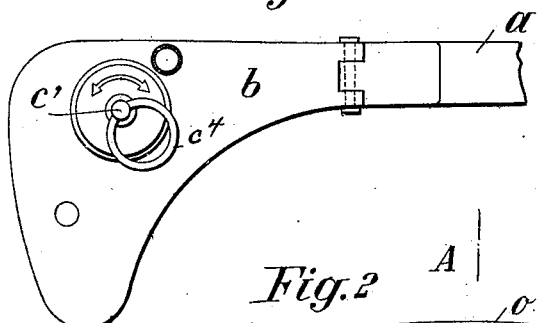
Figure 3:
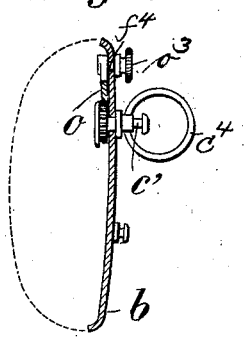
Figure 2:
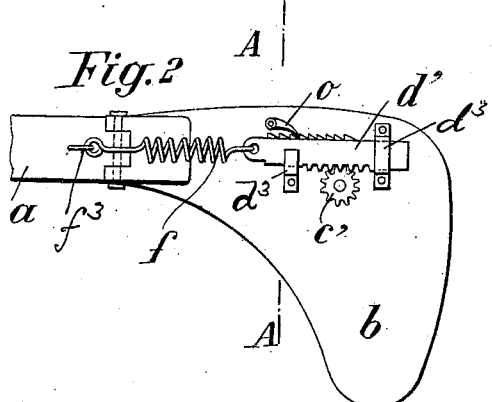
Figure 4:
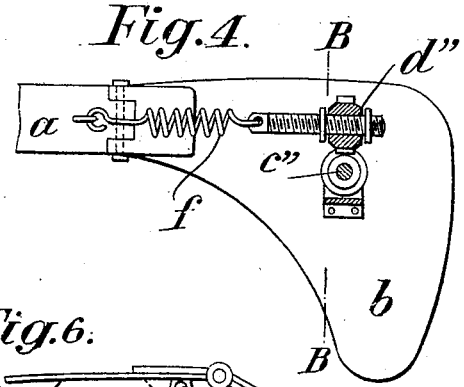
Figure 5:
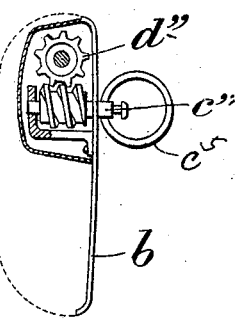
Figure 6:
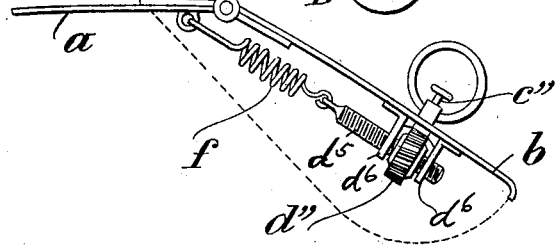

In the annexed drawings: Figure 1 is a rear view of my device. Fig. 2 is a front view. Fig. 3 is a vertical section on line A—A of Fig. 2. Fig. 4 is a side view, partly in section, of a modified form. Fig. 5 is a vertical section on line B—B of Fig. 4. Fig. 6 is an edge view of Fig. 4.

Mounted on the pad plate $b$ which is hingedly connected by means of a hinge with the waist spring $a$, is a pinion $c'$ which meshes with a toothed rack $d'$ attached to the plate $b$. One end of a spiral spring $f$ is attached to the rack, the other end of the spring being attached as at $f^3$ to the spring $a$. By turning the pinion $c'$ the rack will be shifted.

A pawl $o$ pivoted to the plate $b$ and engaging with the teeth of the rack prevents movement of the rack in a direction toward the left as viewed in Fig. 2. This pawl may be actuated from the outside by means of a head $o^3$ which is carried by the pivot pin $f^4$ of the pawl, to raise the pawl out of engagement with the rack teeth, or cause it to engage therewith.

The pinion is mounted on a stud shaft $c'$ which upon the outside carries a ring $c^4$ by which the pinion may be rotated, and thus the tension of the spring $f$ and consequently the pressure of the pad may be more or less increased.

In Figs. 4, 5 and 6 I show a modified construction wherein a worm shaft $c''$ is journaled in the plate $b$ and meshes with a worm pinion $d''$, having a threaded bore within which screws a threaded bolt $d^5$ guided in bearings $d^6$ on plate $b$. The shaft $c''$ is provided exteriorly with a ring $c^5$ for turning the shaft, and thus effecting the shifting of the bolt $d^5$. The spiral spring $f$ is connected at one end to the bolt $d^5$ and attached at its opposite end to the spring $a$. When the bolt is shifted the tension of the spring $f$ and consequently the pressure of the pad may be varied.

The principal advantage of the truss constructed according to the present invention resides in the fact already stated that the pressure exerted by the pad may be controlled with an extreme ease and readiness during wear. Furthermore the pressure is modified according to the motions of the body of the wearer and the member performing this is the spring $f$ which must be considered as a most important intermediate member working as such and independently from the waist spring.

Having now fully described my said invention what I claim and desire to secure by Letters Patent is:—

1. In a truss the combination with the waist spring, of a pad plate hingedly connected to the waist spring, a spiral spring attached at one end to the waist spring, a longitudinally-movable toothed rack carried by the pad plate and to which rack the other end of the spring is attached, a pinion engaging with the teeth of the rack, and means for rotating the pinion.

2. In a truss the combination with the waist spring, of a pad plate, means for hingedly connecting the said pad plate with the said waist spring, a spiral spring arranged on the inside of the said pad plate and connected at one of its ends to the said waist spring, a toothed rack applied on the inside of the said pad plate and adapted to receive at one of its ends the end of the said spiral spring, means for guiding the said toothed rack in line with the said spiral spring, a pinion rotatably mounted on the said pad plate and meshing with the said toothed rack, means for actuating the said pinion from the outside of the said pad plate and means operable from the outside of the said pad plate and, adapted to lock the said toothed rack in position, substantially as and for the purpose set forth.

3. In a truss the combination with the waist spring of a pad plate, means for hingedly connecting the said pad plate to the said waist spring, a spiral spring arranged on the inside of the said pad plate and hingedly connected at one of its ends to the said waist spring, a toothed rack arranged on the inside of the said pad plate in line with the said spiral spring and adapted to receive the other end of the said spiral spring, means for guiding in a straight line the said toothed rack on the said pad plate, a pinion rotatably mounted on the said pad plate and meshing with the said toothed rack, means for rotating the said pinion in one or the other direction from the outside of the said pad plate, ratchet teeth arranged on the said toothed rack opposite the rack teeth, a pawl pivotally connected to the said pad plate and engaging the said ratchet teeth and means for actuating the said pawl from the outside of the said pad plate, substantially as and for the purpose set forth.

In testimony whereof I have hereunto set my hand in presence of two witnesses.

CARL MOLZ.

Witnesses:
PH. ENGELS,
CURTGOLD QUELL.